(12) United States Patent
Shahin

(10) Patent No.: US 12,253,129 B2
(45) Date of Patent: Mar. 18, 2025

(54) BRAKE PAD ASSEMBLY HAVING A PAD SPRING FOR A DISK BRAKE SYSTEM AND DISK BRAKE SYSTEM

(71) Applicant: HL MANDO CORPORATION, Pyeongtaek (KR)

(72) Inventor: Hatem Shahin, Pfaffenhofen (DE)

(73) Assignee: HL MANDO CORPORATION, Pyeongtaek (KR)

( * ) Notice: Subject to any disclaimer, the term of this patent is extended or adjusted under 35 U.S.C. 154(b) by 114 days.

(21) Appl. No.: 17/727,823

(22) Filed: Apr. 25, 2022

(65) Prior Publication Data
US 2023/0228307 A1    Jul. 20, 2023

(51) Int. Cl.
  *F16D 65/097* (2006.01)
  *F16D 55/224* (2006.01)
  *F16D 65/00* (2006.01)

(52) U.S. Cl.
  CPC ....... *F16D 65/0978* (2013.01); *F16D 55/224* (2013.01); *F16D 65/0006* (2013.01)

(58) Field of Classification Search
  CPC ............. F16D 65/0977; F16D 65/0972; F16D 65/0978; F16D 65/0979; F16D 65/0975; F16D 65/0006; F16D 65/097; F16D 65/0976; F16D 55/224; F16D 65/0018; F16D 55/02; F16D 65/122; B62L 1/005
  See application file for complete search history.

(56) References Cited

U.S. PATENT DOCUMENTS

| | | | | |
|---|---|---|---|---|
| 3,616,878 A | * | 11/1971 | Girauldon | F16D 65/0974 188/73.38 |
| 7,201,257 B2 | * | 4/2007 | Nakajima | F16D 65/0972 188/73.31 |
| 8,292,043 B2 | * | 10/2012 | Sekiya | F16D 65/0006 188/73.31 |

(Continued)

FOREIGN PATENT DOCUMENTS

| | | |
|---|---|---|
| DE | 3333670 A1 | 4/1985 |
| DE | 19719640 A1 | 11/1998 |

(Continued)

OTHER PUBLICATIONS

KR 2011012281 A (2011-11-221) (Year: 2011).*

(Continued)

*Primary Examiner* — Robert A. Siconolfi
*Assistant Examiner* — Mahbubur Rashid
(74) *Attorney, Agent, or Firm* — Harvest IP Law, LLP

(57) ABSTRACT

The application relates to a brake pad assembly (10) for a disk brake system and to a disk brake system. The proposed brake pad assembly (10) comprises a back plate (5) having a front side (4) for facing a brake disk (1) of the disk brake system and a friction layer (3) arranged on the front side (4) of the back plate (5) for contacting a friction surface of the brake disk (1). The back plate (5) comprises a guiding protrusion (9) configured to be slidably received within a guiding recess (19) of a carrier (20) of the disk brake system. The brake pad assembly (10) further comprises a pad spring (16) configured to be arranged between the guiding protrusion (9) of the back plate (5) and the guiding recess (19) of the carrier (20). The pad spring (16) is attached to the guiding protrusion (9) of the back plate (5).

13 Claims, 3 Drawing Sheets

(56) References Cited

U.S. PATENT DOCUMENTS

Figure 1:
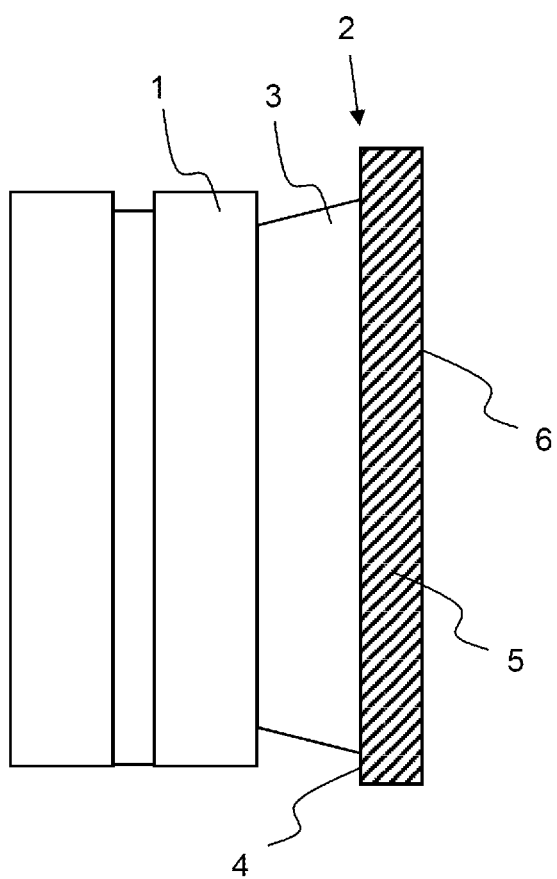

| | | | | |
|---|---|---|---|---|
| 10,371,221 B2* | 8/2019 | Miller | .............. | F16D 65/0978 |
| 10,697,504 B2* | 6/2020 | Tomasz | .............. | F16D 55/2265 |
| 2005/0236236 A1* | 10/2005 | Farooq | .............. | F16D 65/0974 |
| | | | | 188/73.31 |
| 2014/0318905 A1* | 10/2014 | Merrien | .............. | F16D 55/228 |
| | | | | 188/73.38 |
| 2016/0084329 A1* | 3/2016 | Takeo | .............. | F16D 55/226 |
| | | | | 188/73.38 |
| 2021/0062879 A1* | 3/2021 | Okada | .............. | F16D 65/0978 |
| 2021/0156438 A1* | 5/2021 | Toguri | .............. | F16D 65/0977 |

FOREIGN PATENT DOCUMENTS

| | | |
|---|---|---|
| DE | 602004009485 T2 | 8/2008 |
| DE | 102009006285 A1 | 7/2010 |
| DE | 102014112 665 A1 | 3/2016 |
| DE | 102014113617 A1 | 3/2016 |
| GB | 2395534 A * | 5/2004 ......... F16D 65/0006 |

OTHER PUBLICATIONS

WO 2005064194 A1 (Jul. 14, 2005) (Year: 2005).*
ES 2372661 T3 (Jan. 25, 2012) (Year: 2012).*
DE 102014112665 B4 (Sep. 16, 2021) (Year: 2021).*
CN 112313426 A (Feb. 2, 2021) (Year: 2021).*
JP 56003328 A (Jan. 14, 1981) (Year: 1981).*
EP 1700050 B1 (Jul. 22, 2009) (Year: 2009).*
WO 2008062894 A1 (May 29, 2008) (Year: 2008).*
DE 102019212896 A1 (Oct. 22, 2020) (Year: 2020).*
DE OA dated Jan. 19, 2023.

* cited by examiner

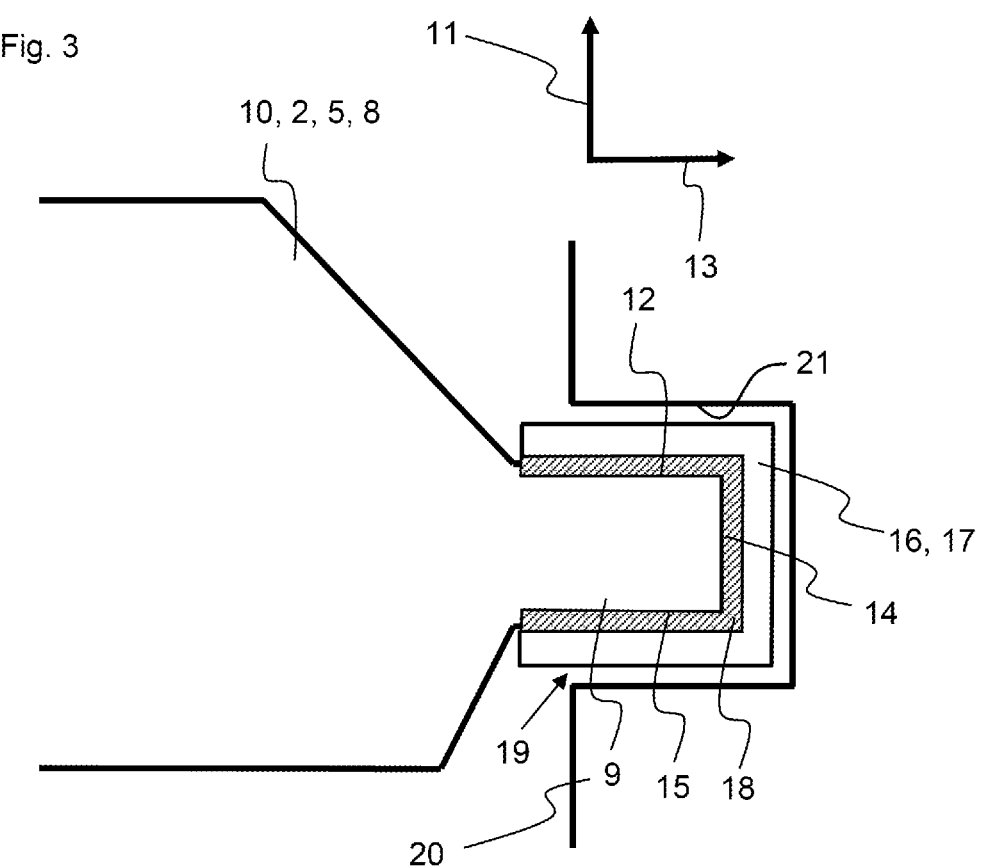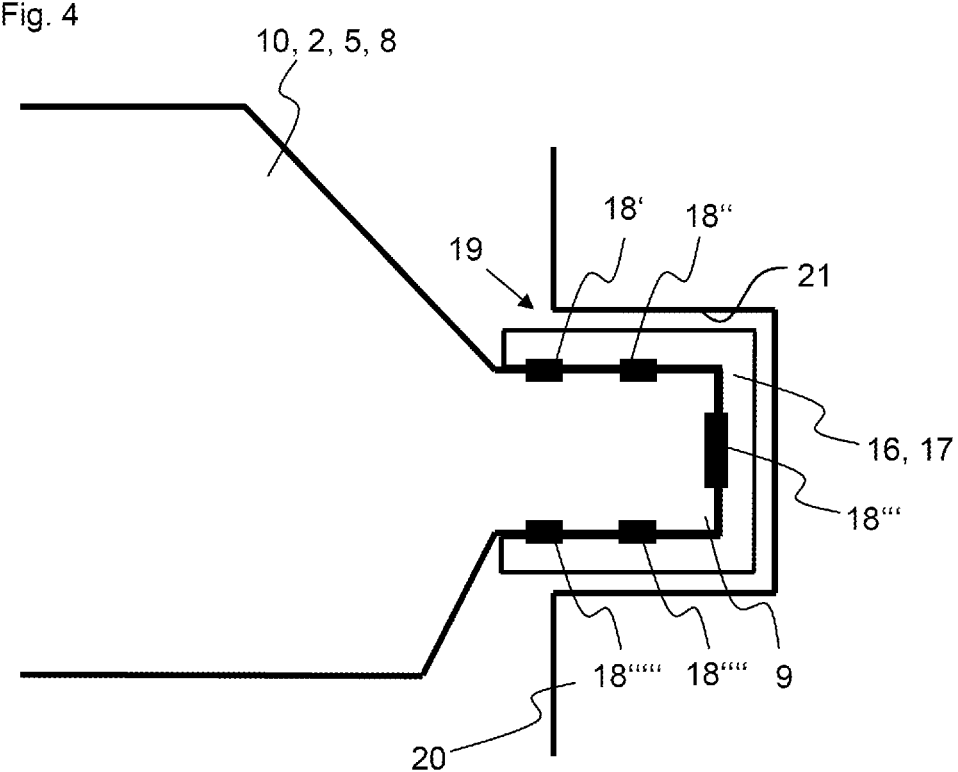

BRAKE PAD ASSEMBLY HAVING A PAD SPRING FOR A DISK BRAKE SYSTEM AND DISK BRAKE SYSTEM

The application relates to a brake pad assembly for a disk brake system and to a disk brake system. The brake pad assembly has a pad spring.

Brake Engineers are in search for robust solutions to suppress squeal noises (tonal loud noises typically appearing in frequencies between 1000 and 16000 Hz) in disk brake systems. Different solutions are known to improve the noise, vibration, and harshness (NVH) characteristics, including a steel shim glued to a back side of a back plate of a brake pad assembly, different chamfers on a pad of the brake pad assembly, slots on pad surfaces contacting the disk, modifications of friction material of the brake pads, an underlayer connecting the friction material to the back plate, and additional massive bodies on certain components like a carrier or the housing. The main effect of the shim is to decouple system modes from each other. While these solutions can help improve the squeal noise characteristics, in most cases these solutions work well only under specific braking conditions (low or high frequency, cold or warm temperature). Prior art can be found, e.g., in document DE 197 06 122 A1. Also, it is known in the prior art to provide a pad spring or an abutment clip residing on the carrier and arranged between the back plate of the brake pad assembly and the carrier.

In view of the above-mentioned aspects, it is an object of the present invention to provide an improved brake pad assembly for a disk brake system. In particular, it is an object of the application to provide a compact and robust brake pad assembly with a low mass at a low cost, which reliably suppresses noise, in particular squeal noise. In addition, it is an object of the application to provide an improved disk brake system having these advantages.

This objective is achieved by a brake pad assembly for a disk brake system comprising the features of claim 1 and by a disk brake system having the features of another claim. Optional further features and further developments will become apparent from the dependent claims and the detailed description in conjunction with the accompanying figures.

The proposed brake pad assembly for a disk brake system comprises a back plate having a front side for facing a brake disk of the disk brake system and a friction layer arranged on the front side of the back plate for contacting a friction surface of the brake disk. The back plate comprises a guiding protrusion configured to be slidably received within a guiding recess of a carrier of the disk brake system. The guiding protrusion may be an ear portion of the back plate. The guiding recess of the carrier may be a guiding groove. The brake pad assembly further comprises a pad spring configured to be arranged between the guiding protrusion of the back plate and the guiding recess of the carrier. The pad spring is attached to the guiding protrusion of the back plate. The pad spring may be configured to prevent direct contact between the back plate and the carrier. The pad spring may have a positive effect on the corrosion behavior. In addition, the pad spring can further improve an ease of movement of the back plate relative to the carrier. Further, the pad spring may provide support and/or abutment in tangential and radial directions and may achieve a well-defined fit of the brake pad assembly within the guiding recess of the carrier. Thereby, an unwanted movement and/or rotation of the brake pad assembly may be prevented. Because the pad spring is attached to the guiding protrusion of the back plate, the noise dampening behavior of the brake system may be improved. The attachment may enable a relative motion of the pad spring with respect to the carrier only. The pad spring may be movable in the axial direction together with back plate as a unit. Typically, the position of the pad spring with respect to the back plate is fixed due to the attachment. The pad spring may be attached to the guiding protrusion of the back plate in a manner that does not allow any gap or clearance or relative motion between both components. It has been found that one reason for brake noises, especially squeal noises, in known disk brake systems is the relative motion between components which contact each other. Relative motion and squeal noise generation may occur during braking or after braking when releasing the brake force, therefore squeal can arise during or after braking. The present invention may avoid relative radial and tangential motion of the brake pad assembly with respect to the carrier and may enable a well-defined contact area between the brake pad assembly and the carrier. Further, the present invention may avoid relative radial, tangential and axial motion of the pad spring with respect to the back plate. Thereby, a dynamic behavior of the disk brake system is improved and noise is dampened. By attaching the pad spring to the guiding protrusion and, in some embodiments, not to any other part of the back plate or the carrier, the noise generation can be efficiently avoided by avoiding uncontrolled and undefined relative motion between components in the area that is important for the noise characteristics, because the region of the guiding protrusion is highly relevant for transmission of forces such as brake torque between the brake pad assembly and the carrier. Hence, the present invention enables a compact and robust brake pad assembly having only few components and a low mass, which reliably suppresses noise, in particular squeal noise.

The application further relates to the disk brake system. The disk brake system may comprise a brake pad assembly as described above or below. The disk brake system may further comprise the carrier. The brake pad assembly may be configured to slide with respect to the carrier. The brake pad assembly may be configured to slide with respect to the carrier in an axial direction upon brake application. The pad spring typically moves in the axial direction together with the back plate upon application of the brake. The axial direction may be parallel to an axis of rotation of a brake disk. In most embodiments, the disk brake system is a floating caliper brake. The disk brake system may comprise a brake piston and/or a caliper finger. The brake piston or caliper finger may be configured to push against a back side of the brake pad assembly to push the friction layer of the brake pad assembly against the friction surface of the brake disk. The back side of the brake pad assembly may be formed by a back surface of the back plate.

In some embodiments, the pad spring is attached to the guiding protrusion of the back plate using at least one of bolts and rivets. In some embodiments, the pad spring is attached to the guiding protrusion of the back plate using a means of fixation, wherein the means of fixation includes recesses within the guiding protrusion of the back plate. The bolts or rivets may be received within the recesses. The bolts or rivets may be recessed with respect to an outer surface of the pad spring. In particular, the bolts or rivets may be countersunk or counterbored. In this manner, the bolts or rivets may not extend all the way toward the outer surface of the pad spring. In this way, the sliding characteristics of the brake pad assembly within the carrier may be further improved and noise generation may be further reduced. In some embodiments, the pad spring is attached to the guiding protrusion of the back plate using at least two, in particular at least three, bolts or rivets. In this way, a flat and tight contact between the guiding protrusion and the pad spring is further improved and noise generation is further reduced.

Additionally or alternatively, the pad spring may be attached to the guiding protrusion of the back plate using an adhesive. The adhesive may be arranged between the pad spring and the guiding protrusion of the back plate. The adhesive may form an adhesive layer. By using adhesive, the dynamic interface properties between the pad spring and the back plate can be further improved. In this way, generation of noise generation may be further reduced. The adhesive may enable a beneficial damping behavior and may lead to a decoupling modes at an interface between back plate and the pad spring. In most embodiments, the adhesive is formed by at least two, in particular at least three, adhesive regions. Thereby, a flat and tight contact between the guiding protrusion and the pad spring may be enabled and noise generation may be further reduced.

In most embodiments, the pad spring is attached to a surface of the guiding protrusion of the back plate. By attaching the pad spring to the surface of the guiding protrusion of the back plate, a tight and flat connection between back plate and surface may be achieved. The surface of the guiding protrusion may face the guiding recess of the carrier. The surface of the guiding protrusion may be oriented such that axial directions lie within the surface. The surface of the guiding protrusion may be oriented essentially perpendicular to the friction surface of the brake disk. In most embodiments, the surface of the guiding protrusion is not a back surface or a front surface of the guiding protrusion. The back and front surfaces of the guiding protrusion typically delimit the guiding protrusion in positive and negative axial directions. The surface of the guiding protrusion of the back plate may be a side surface, a top surface or a bottom surface of the guiding protrusion of the back plate. The side surface of the guiding protrusion typically delimits the guiding protrusion in a tangential direction. The top surface of the guiding protrusion typically delimits the guiding protrusion in a positive radial direction. The bottom surface of the guiding protrusion typically delimits the guiding protrusion in a negative radial direction.

In some embodiments, the pad spring is attached to the surface of the guiding protrusion of the back plate such that the pad spring lies flat against the surface of the guiding protrusion of the back plate. There may be essentially no gap between the pad spring and the surface of the guiding protrusion. In case there is a gap, a maximal width of the gap typically amounts to at most 0.5 mm. Thereby, a fixed tight connection between the back plate and the pad spring may be achieved. By ensuring that the pad spring lies flat against the surface, even minor relative motion between the pad spring and the back plate is avoided and therefore uncontrollable noise is prevented.

In most embodiments, the pad spring comprises a metal layer. Typically, the pad spring is formed exclusively by the metal layer. The metal layer may have a uniform thickness. An outer surface of pad spring may be formed by an outer surface of the metal layer. Further, an inner surface of the pad spring may be formed by an inner surface of the metal layer. The inner surface of the metal layer may lie flat against the surface of guiding protrusion of back plate. In some embodiments, the pad spring is exclusively formed by a single metal layer only. In most embodiments, the pad spring forms a stiff or rigid body. The pad spring may have no intermediate layer between the metal layer and guiding protrusion of back plate in some embodiments. Further, apart from the adhesive, rivets or bolts, if provided, there may be only the pad spring, in particular only the metal layer, arranged between the back plate and the carrier. There may be only a single metal layer between the back plate and the carrier. The metal layer and/or pad spring may be bent. In most embodiments, the metal layer and/or pad spring is not folded. The metal layer and/or pad spring may comprise no sharp bends or kinks that have a bending angle of more than 120 degrees.

Typically, the pad spring or the metal layer has a thickness of at least 0.3 mm and/or at most 0.6 mm. The pad spring may be made from a flat body. The pad spring may be ribbon-shaped. The pad spring may have a C-shape. The pad spring may be bent in at least one or in at most two regions. A radius of curvature in the bent region or bent regions may be at least 45 degrees, e.g., at least 70 degrees, and/or at most 110 degrees. The bent region or bent regions may be bent with a bending axis being parallel to the axial direction. In particular, the pad spring may cover the top surface and the bottom surface and the side surface of the guiding protrusion of the back plate. Typically, the pad spring is formed from a straight ribbon-shaped part by bending sections of the straight ribbon-shaped part. A width of the pad spring, e.g., a ribbon width, may be at least 3 mm and/or at most 8 mm, for example 5 mm, in particular as measured in the axial direction. A length of the pad spring as measured along a curved path of the pad spring, e.g., corresponding to an overall length of the ribbon in an un-curved straight state, may be at least 7 mm. In most embodiments, a length of the pad spring as measured along a curved path of the pad spring, e.g., corresponding to an overall length of the ribbon in an un-curved straight state, may be at most 60 mm, in particular at most 40 mm.

In typical embodiments, the pad spring is attached to the guiding protrusion of the back plate such that the pad spring covers the back plate in the region of a side surface, a top surface, and/or a bottom surface of the guiding protrusion of the back plate. The pad spring may be attached to the guiding protrusion of the back plate such that the pad spring covers the back plate only in the region of at least one of a side surface, a top surface, and a bottom surface of the guiding protrusion of the back plate. For example, the pad spring may not cover a back surface or a front surface of the back plate. In some embodiments, the pad spring is attached to a top surface and/or to a bottom surface of the guiding protrusion of the back plate. Thereby, relative motion between the carrier and the brake pad assembly in the radial direction may be reduced. Further, relative motion in the radial direction between the pad spring and the guiding protrusion of the back plate may be efficiently reduced to further reduce noise generation.

In most embodiments, the pad spring is attached to the guiding protrusion of the back plate such that the pad spring covers a side surface of the guiding protrusion of the back plate. The side surface may delimit the guiding protrusion in the tangential direction. By arranging the pad spring such that it covers the side surface of the guiding protrusion, relative motion in the direction that is most important for brake torque transmission in realistic braking scenarios, i.e., in the tangential direction, may be efficiently controlled. In this embodiment, to improve control over the relative motion of the brake pad assembly and the carrier in the tangential direction, the pad spring may be attached to the side surface of the guiding protrusion. Additionally or alternatively, the pad spring may be arched outward in a tangential direction in a portion covering the side surface of the guiding protrusion of the back plate. In this manner, a well-defined sliding contact between the brake pad assembly and the carrier may be achieved for reduced noise reduction. In some embodiments, a gap is formed between the side surface of the guiding protrusion of the back plate and the pad spring. Thereby, the sliding contact may and noise dampening properties may be further improved. For example, the gap may be an air gap. In other embodiments, the gap may be filled with a soft and/or elastic material. The pad spring may be attached to the top surface and to the bottom surface of the guiding protrusion in this embodiment.

For example, the pad spring may have a C-shape covering a side surface, a top surface and a bottom surface of the guiding protrusion of the back plate. In this way, relative motion between components may be efficiently reduced in the radial and tangential directions for improved noise reduction.

A width of a gap between an outer surface of the pad spring and the guiding recess of the carrier may be at least 0.6 mm and/or at most 1.2 mm, for example 0.8 mm, in particular when the brake is not applied. The pad spring may be configured come into direct contact with the carrier upon application of the brake.

In typical embodiments, the back plate comprises a back plate body. The guiding protrusion of the back plate may protrude in a tangential direction from the back plate body. In this manner, the guiding protrusion may extend in a sideward direction and may define a leading or a trailing portion of the back plate or a part thereof. The back plate may comprise another guiding protrusion. Another pad spring may be attached to the other guiding protrusion of the back plate. The other pad spring may have any or all of the features of the pad spring described above or below. The guiding protrusion may define a leading portion of the back plate, and the other guiding protrusion may define a trailing portion of the back plate. The pad spring attached to the guiding protrusion and the pad spring attached to the other guiding protrusion may differ in size and/or shape, according to some embodiments.

In typical embodiments, the back plate is formed as a single part, for example as a non-joined and/or monolithic part. A thickness of the back plate and/or the guiding protrusion of the back plate may be at least 3 mm and/or at most 8 mm, for example 5 mm, in particular as measured in the axial direction. The back plate and/or the guiding protrusion of the back plate typically comprises steel, phenolic resin, aluminium, hard plastic, or cast iron or is made thereof. The carrier typically comprises steel, aluminium, or grey iron or is made thereof.

The disk brake system may comprise another brake pad assembly having any or all of the features of the brake pad assembly described above or below. The brake pad assembly may be configured to be pushed on by the caliper finger, while the other brake pad assembly may be configured to be pushed on by the brake piston. The brake pad assembly and the other brake pad assembly may differ in size/or shape, according to some embodiments.

Exemplary embodiments will be described in conjunction with the following figures.

Figure 2:
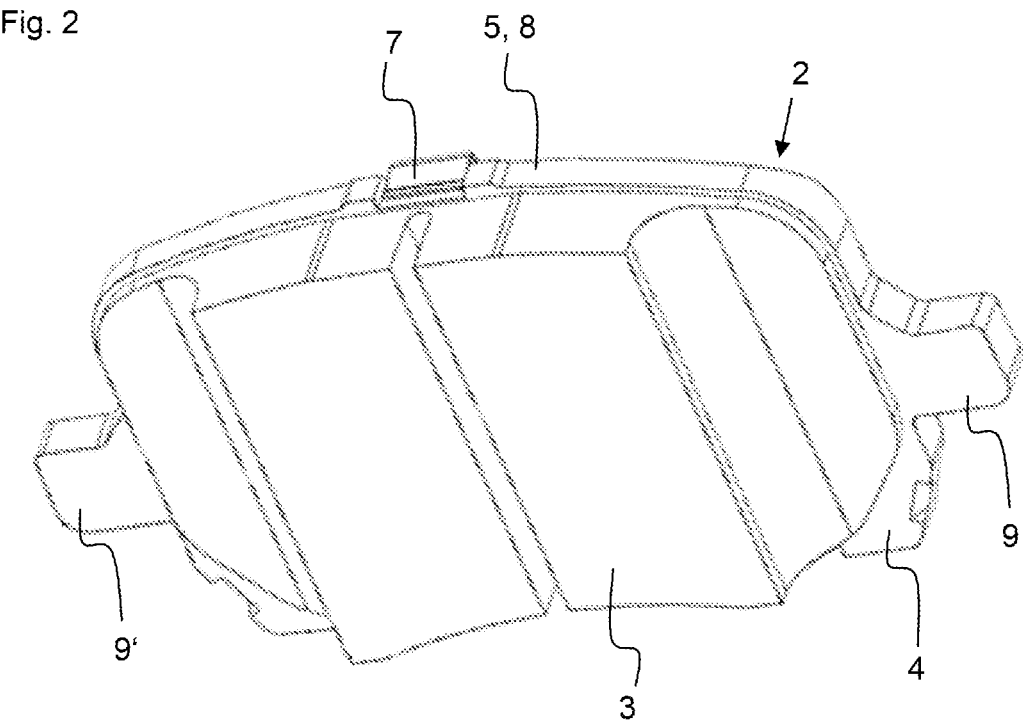
Figure 5:
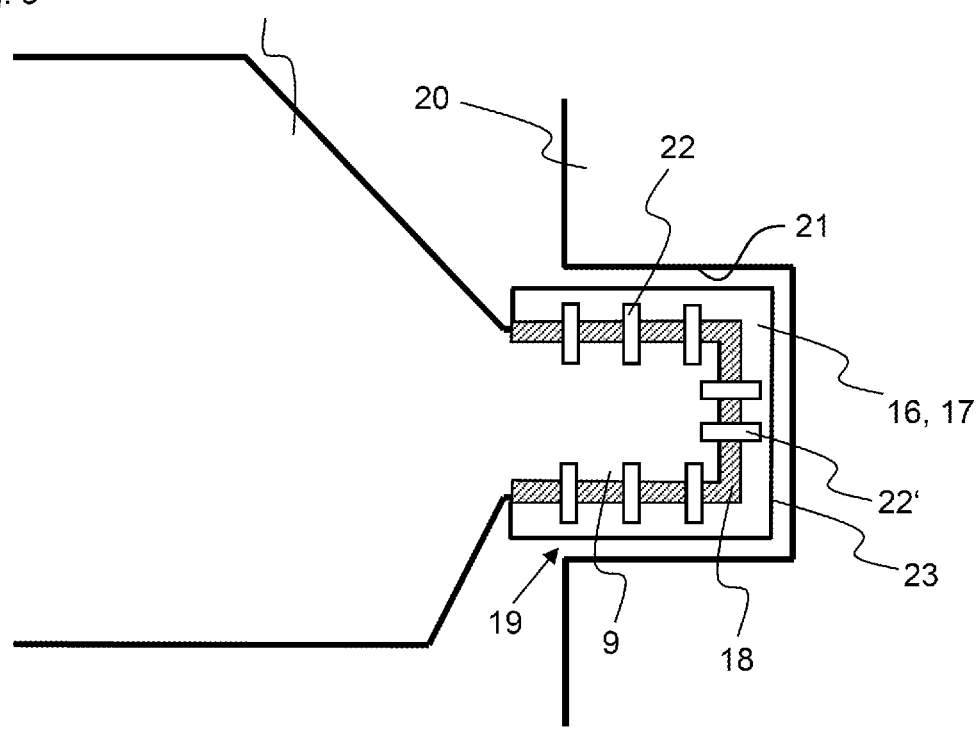
Figure 6:
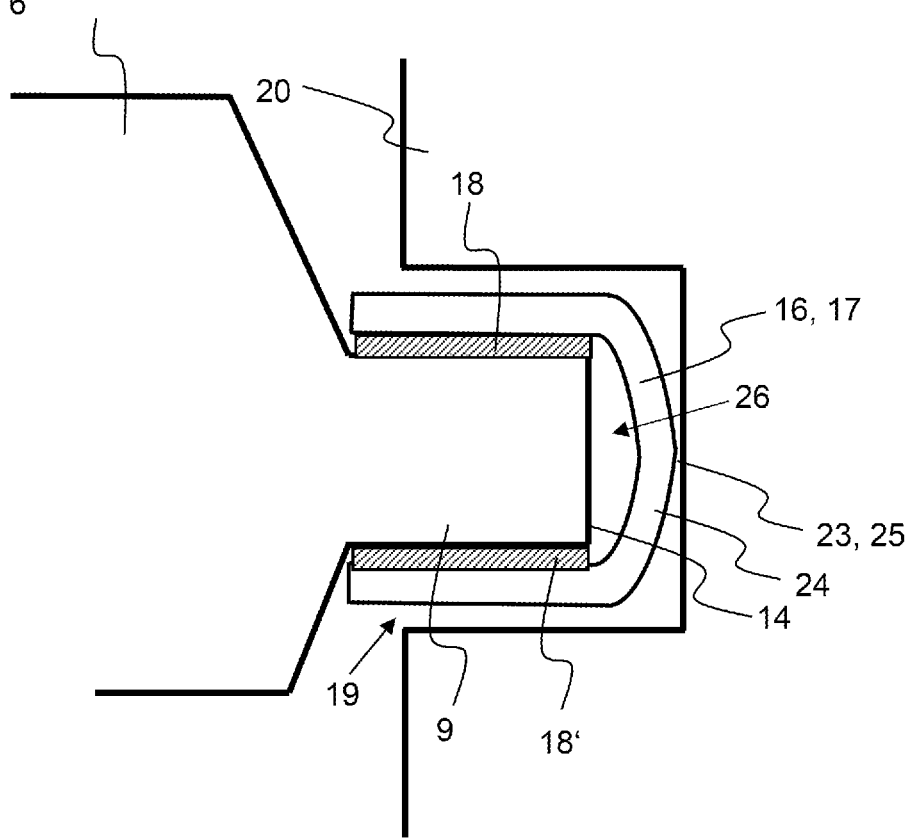

FIG. 1 shows a schematic cross sectional illustration of a brake pad and a brake disk, FIG. 2 shows a perspective view of a brake pad, FIG. 3 shows a schematic cross-sectional view of a brake pad assembly and a carrier, FIG. 4 shows a schematic cross-sectional view of a brake pad assembly and a carrier according to another embodiment, FIG. 5 shows a schematic cross-sectional view of a brake pad assembly and a carrier according to another embodiment, and FIG. 6 shows a schematic cross-sectional view of a brake pad assembly and a carrier according to another embodiment.

FIG. 1 shows a brake disk 1 of a of a disk brake system for a vehicle. The disk brake system comprises a caliper housing, a caliper finger and a brake piston. The disk brake system further comprises a brake pad assembly having a brake pad 2, which may be attached relative to the caliper finger or to the brake piston such that upon application of the brake the caliper finger or the brake piston pushes the brake pad 2 in an axial direction toward the brake disk 1. The brake pad 2 has a friction layer 3, which is pushed against a friction surface of the brake disk 1 upon actuation of the disk brake system, e.g., hydraulic or electric actuation. The friction layer 3 contains a material that shows a good stopping performance and heat transfer when engaging with the brake disk 1. The friction layer 3 is attached to a front side 4 of a back plate 5, which provides structural stability to the brake pad 2. The brake piston or the caliper finger is configured to push against a back side 6 of the back plate 5 to push the friction layer 3 against the brake disk 1. In most embodiments, the back plate 5 is made of a metal, in particular steel. A thickness of the back plate 5 may be, e.g., 5 mm. The friction layer 3 can have a thickness of at least 8 mm and/or at most 15 mm, for example. The material of the friction layer 3 can for instance comprise at least one of copper, iron sulphide, graphite, zinc powder, basalt, calcium carbonate, tin sulphide, zinc aluminium, phenolic resin, rubber dust and mineral fibre. These materials show good stopping performance and heat transfer when engaging with the brake disk.

FIG. 2 shows a perspective view of the brake pad 2. Corresponding and reoccurring features shown in the different figures are denoted using the same reference numerals. The friction layer 3 of the brake pad 2 is fixed to the front side 4 of the back plate 5. A clip-on-shim 7 is attached to the back side 6 of the back plate 5 for noise dampening. The back plate 5 comprises a back plate body 8 forming the main portion of the back plate 5 and carrying the friction layer 3. The back plate 5 further comprises a pair of guiding protrusions 9, 9' formed at the two tangential sides of the back plate 5 and each configured to be received within a respective guiding recess of a carrier of the disk brake system. In the embodiment shown, the back plate body 5 and the guiding protrusions 9, 9' are formed as a one-piece, non-joined part.

FIG. 3 shows a cross-sectional view of the brake pad assembly 10 comprising the brake pad 2. The guiding protrusion 9 is delimited in a positive radial direction 11 by a top surface 12, in a tangential direction 13 by a side surface 14 and in a negative radial direction by a bottom surface 15. The brake bad assembly 10 further comprises a pad spring 16. The pad spring 16 has a C-shape and is formed by bending a ribbon-shaped sheet metal layer 17 such that it covers the top surface 12, the side surface 14 and the bottom surface 15 of the guiding protrusion 9 of the back plate 5. The pad spring 16 is glued to the top surface 12, the side surface 14 and the bottom surface 15 of the guiding protrusion 9 of the back plate 5 by an adhesive layer 18 to firmly connect the pad spring 16 with the back plate 5 such that the pad spring 16 lies flat against the top surface 12, the side surface 14 and the bottom surface 15 of the guiding protrusion 9 of the back plate 5.

The guiding protrusion 9 of the back plate 5 of the brake pad 2 is slidably received within a guiding recess 19 of the carrier 20 of the disk brake system. The guiding recess 19 of the carrier 20 defines guiding surfaces facing the guiding protrusion 9 of the back plate 5. One of the guiding surfaces of the carrier 20 is marked using reference numeral 21 in the figure. The pad spring 16 and its attachment to the guiding protrusion 9 of the back plate 5 improve brake torque transmission at interface areas between components and reduce relative motion between contacting parts, which leads to a reduced generation of squeal noise.

FIG. 4 shows a cross-sectional view of the brake pad assembly 10 according to another embodiment. The brake pad assembly 10 corresponds to the brake pad assembly 10 discussed above, except that the adhesive layer 18 is formed by multiple separate patches of adhesive 18', 18", 18'", 18"", 18""'.

FIG. 5 shows a cross-sectional view of the brake pad assembly 10 according to another embodiment. The brake pad assembly 10 corresponds to the brake pad assemblies 10 discussed above, except that the pad spring 16 is attached to the guiding protrusion 9 of the back plate 5 using multiple bolts or rivets in addition to the adhesive layer 18. Eight bolts or rivets are shown in the figure, two of which are marked using reference numerals 22 and 22'. The bolts or rivets 22, 22' are received within bores within the surfaces 12, 14, 15 of the guiding protrusion 9 of the back plate 5, and are configured to attach the pad spring 16 to brake pad 2. The bolts or rivets 22, 22' are recessed with respect to an outer surface 23 of the pad spring 16, which is formed by an outer surface of the metal layer 17. In this way, the bolts or rivets 22, 22' do not extend all the way toward the outer surface 23 of the pad spring 16.

FIG. 6 shows a cross-sectional view of the brake pad assembly 10 according to another embodiment. The brake pad assembly 10 corresponds to the brake pad assemblies 10 discussed above, except that the pad spring 16 is merely attached to the back plate 5 by an adhesive layer 18, 18 arranged between the pad spring 16 and the top surface 12 as well as between the pad spring 16 and the bottom surface 15 of the guiding protrusion 9. As for the brake pad assemblies 10 described above, the pad spring 16 forms a C-shape and has a portion 24 that covers the side surface 14 of the guiding protrusion 9. The portion 24 of the pad spring 16 is curved and arched outward such that it forms a protrusion 25 extending in the tangential direction toward a guiding surface of the carrier 20. An air gap 26 is formed within a hollow space between the portion 24 of the pad spring 16 and the side surface of the guiding protrusion 9. In this way, the sliding contact between the brake pad assembly 10 and the carrier 20 may be further improved to reduce noise generation. When the brake is not applied, a width between the outer surface 23 of the pad spring 16 and the guiding recess 19 of the carrier 20 may, for example, amount to 0.8 mm.

Features of the different embodiments which are merely disclosed in the exemplary embodiments may be combined with one another and may also be claimed individually.

LIST OF REFERENCE NUMERALS

1 Brake disk
2 Brake pad
3 Friction layer
4 Front side of back plate
5 Back plate
6 Back side of back plate
7 Clip-on-shim
8 Back plate body
9, 9' Guiding protrusions
10 Brake pad assembly
11 Positive radial direction
12 Top surface
13 Tangential direction
14 Side surface
15 Bottom surface
16 Pad spring
17 Metal layer
18 Adhesive layer
18', 18", 18'", 18"", 18""' Patches of adhesive
19 Guiding recess
20 Carrier
21 Guiding surface
22, 22' Bolts or rivets
23 Outer surface of pad spring
24 Portion of pad spring
25 Protrusion of portion of pad spring
26 Gap

The invention claimed is:

1. A brake pad assembly for a disk brake system, comprising
a back plate having a front side for facing a brake disk of the disk brake system and
a friction layer arranged on the front side of the back plate for contacting a friction surface of the brake disk,
wherein the back plate comprises a guiding protrusion configured to be slidably received within a guiding recess of a carrier of the disk brake system,
further comprising a pad spring configured to be arranged between the guiding protrusion of the back plate and the guiding recess of the carrier,
characterized in that the pad spring is fixedly attached to the guiding protrusion of the back plate at a top surface and a bottom surface of the guiding protrusion using bolts, rivets, and/or an adhesive,
wherein the pad spring is attached to the guiding protrusion of the back plate using a first plurality of bolts or rivets at the top surface and a second plurality of bolts or rivets at the bottom surface of the guiding protrusion,
wherein the pad spring is attached to the guiding protrusion of the back plate further using the adhesive at the top surface and the bottom surface of the guiding protrusion such that the first and second plurality of bolts or rivets are installed through the adhesive between the pad spring and the guiding protrusion of the back plate.

2. The brake pad assembly of claim 1, characterized in that the pad spring is attached to a side surface of the guiding protrusion of the back plate using the at least one of bolts, rivets, and/or an adhesive.

3. The brake pad assembly of claim 2, characterized in that the pad spring is attached to at least one of the top surface, the bottom surface, and side surface of the guiding protrusion of the back plate such that the pad spring lies flat against the at least one of the top surface, the bottom surface, and side surface of the guiding protrusion of the back plate.

4. The brake pad assembly of claim 1, characterized in that the pad spring comprises a metal layer.

5. The brake pad assembly of claim 1, characterized in that the pad spring has a thickness of at least 0.3 mm and at most 0.6 mm.

6. The brake pad assembly of claim 1, characterized in that the pad spring is attached to the guiding protrusion of the back plate such that the pad spring covers a side surface of the guiding protrusion of the back plate, wherein the side surface delimits the guiding protrusion in a tangential direction.

7. The brake pad assembly of claim 6, characterized in that the pad spring is arched outward in a tangential direction in a portion covering the side surface of the guiding protrusion of the back plate.

8. The brake pad assembly of claim 7, characterized in that a gap is formed between the side surface of the guiding protrusion of the back plate and the pad spring.

9. The brake pad assembly of claim 1, characterized in that the pad spring has a C-shape covering a side surface, the top surface and the bottom surface of the guiding protrusion of the back plate.

10. A disk brake system comprising a brake pad assembly according to claim 1 and further comprising the carrier, wherein the brake pad assembly is configured to slide with respect to the carrier in an axial direction upon brake application.

11. The disk brake system of claim 10, characterized in that a width of a gap between an outer surface of the pad spring and the guiding recess of the carrier is at least 0.6 mm and at most 1.2 mm.

12. The brake pad assembly of claim 1, wherein the first and second plurality of bolts or rivets are received by bores formed on the top surface and the bottom surface of the guiding protrusion and bores formed on an internal surface of the pad spring such that the first and second plurality of bolts or rivets do not extend outside an outer surface of the pad spring.

13. The brake pad assembly of claim 1, wherein, when the pad spring includes a top part, a bottom part and a side part covering the top surface, the bottom surface and the side surface of the guiding protrusion of the back plate, respectively, and when the guiding recess has a top guiding surface, a bottom guiding surface, and a side guiding surface corresponding to the top surface, the bottom surface and the side surface of the guiding protrusion, respectively, the side part is convexly curved from a radial outer end to a radial inner end such that a radial middle portion of the side part protrudes in a tangential direction toward the side guiding surface of the guiding recess.

* * * * *